United States Patent
Inaba et al.

(10) Patent No.: US 7,345,126 B2
(45) Date of Patent: Mar. 18, 2008

(54) PRODUCTION METHOD OF HYDROXYL-CONTAINING POLYMER

(75) Inventors: Yoshihiro Inaba, Kanagawa (JP); Takako Kobayashi, Kanagawa (JP); Hiroshi Yamamoto, Kanagawa (JP); Chisato Urano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/194,722

(22) Filed: Aug. 1, 2005

(65) Prior Publication Data

US 2006/0205905 A1 Sep. 14, 2006

(30) Foreign Application Priority Data

Mar. 14, 2005 (JP) .............................. 2005-071998

(51) Int. Cl.
*C08F 118/02* (2006.01)
*C08G 69/137* (2006.01)

(52) U.S. Cl. ...................... 526/316; 526/213; 526/313; 525/61; 525/328.8; 525/286

(58) Field of Classification Search ................ 526/213, 526/313, 319; 525/61, 328.8, 386
See application file for complete search history.

(56) References Cited

U.S. PATENT DOCUMENTS

| | | | | |
|---|---|---|---|---|
| 4,238,569 A | * | 12/1980 | Lim et al. ...................... | 521/52 |
| 5,466,555 A | * | 11/1995 | Taguchi et al. .......... | 430/108.4 |
| 6,107,425 A | * | 8/2000 | Sinta et al. .................. | 526/313 |
| 6,576,684 B1 | * | 6/2003 | Desobry et al. ............. | 522/167 |
| 2004/0091709 A1 | * | 5/2004 | Ohmura et al. ............. | 428/404 |
| 2004/0242813 A1 | * | 12/2004 | Nesvadba et al. .......... | 526/135 |

FOREIGN PATENT DOCUMENTS

| | | |
|---|---|---|
| JP | 60-122770 | 7/1985 |
| JP | 61-157513 | 7/1986 |
| JP | 62-95308 | 5/1987 |
| JP | 1-111769 | 4/1989 |
| JP | 3-239709 | 10/1991 |
| JP | 7-10943 | 1/1995 |
| JP | 2001-318086 | 11/2001 |
| JP | 2003-147005 | 5/2003 |

* cited by examiner

*Primary Examiner*—David W. Wu
*Assistant Examiner*—M. Bernshteyn
(74) *Attorney, Agent, or Firm*—Fildes & Outland, P.C.

(57) ABSTRACT

The present invention provides a production method of a hydroxyl-containing polymer including: protecting a hydroxyl group of a hydroxyl-containing monomer with a protecting group to make the monomer a protected monomer with decreased hydrophilicity; adding the protected monomer alone or together with a hydrophobic monomer to a water-based medium containing a salt and a dispersion stabilizer; adding a polymerization initiator to the mixture to carry out suspension polymerization; and de-protecting the obtained polymer having the protecting group to recover the hydroxyl group.

19 Claims, No Drawings

PRODUCTION METHOD OF HYDROXYL-CONTAINING POLYMER

CROSS-REFERENCE TO RELATED APPLICATION

This application claims priority under 35 USC 119 from Japanese Patent Application No. 2005-71998, the disclosure of which is incorporated by reference herein.

BACKGROUND OF THE INVENTION

1. Field of the Invention

The present invention relates to a production method of a hydroxyl-containing polymer, more particularly to a production method of a hydroxyl-containing polymer preferably usable for carriers of diagnosis drugs and pharmaceutical products, chromatography carriers, viscosity adjustment agents, resin molding materials, coating material additives, crosslinking/curing agents, and cosmetic product additives.

2. Description of the Related Art

So far, in the case of producing polymers by polymerizing monomer mixtures containing hydroxyl-containing monomers such as hydroxyethyl(meth)acrylate, polyethylene glycol(meth)acrylate, since the monomers are water-soluble, a method of solution polymerization carried out in an aqueous solution, a method of emulsion polymerization carried out in water, a method of suspension polymerization carried out in water, and a method of reversed-phase suspension polymerization have been known as methods of producing such polymers.

For example, production methods of solution polymerization of monomer mixtures containing a carboxyl-containing monomer and a monomer having polyethyleneglycol chain in a mixed solvent of a water-soluble organic solvent and water have been disclosed (e.g., refer to Japanese Patent Application Laid-Open (JP-A) No. 3-239709). However, in the case of adding a hydrophobic monomer such as styrene, phase-separation takes place to make it difficult to obtain copolymers.

Further, techniques of obtaining polymers by emulsion polymerization of a monomer mixture containing a carboxyl-containing monomer and a monomer having polyethyleneglycol chain in water have been disclosed (e.g. refer to JP-A Nos. 60-122770, 1-111769, and 7-10943). However, since the particles to be obtained by the emulsion polymerization have a size equal to 1 μm or smaller, washing of the particles for removing impurities such as the residual monomers, surfactants and the like is difficult and thus the particles are unsuitable for uses as carriers of diagnosis drugs and pharmaceutical products carriers, chromatography carriers, which are susceptible to the impurities.

Further, methods of obtaining polymers by suspension polymerization of hydroxyethyl (meth) acrylate with a monomer mixture containing a hydrophobic monomer and solvent such as diethylene glycol dimethacrylate, glycidyl methacrylate, and toluene in water have been disclosed (e.g., refer to JP-A No. 2001-318086). However, since hydroxyethyl (meth) acrylate is water-soluble, when the suspension polymerization is carried out in water, polymerization takes place even in water to result in occurrence of disadvantageous agglomeration of particles during polymerization. Also, since the water-soluble monomer is distributed in oil droplets and water, it is difficult to produce polymers with desired copolymerization ratios and further since the methods require solvents, the solvents have to be removed after the polymerization and therefore it is required to remove the solvents from polymers.

On the other hand, as one method of polymerization of water-soluble ethylenic unsaturated monomers, so-called reversed-phase suspension polymerization methods for carrying out polymerization by suspending and dispersing an aqueous monomer solution in a hydrophobic solvent have been known well and for example, methods of using nonionic surfactants of HLB 3 to 6 (e.g. refer to JP-A No. 61-157513) and methods of using copolymers of α-olefins and α,β-unsaturated polycarboxylic acid anhydrides, or their derivatives (e.g. refer to JP-A No. 62-95308) have been known. However, the reversed-phase suspension polymerization methods can be applicable mainly for water-soluble monomers and the methods are difficult to be applied for copolymerization of hydrophobic monomers.

On the contrary, methods of copolymerization with hydrophobic monomers have also been disclosed (e.g. refer to JP-A No. 2003-147005). However the content of copolymerizable hydrophobic vinyl monomers is limited to 5% by mass in relation to the water-soluble vinyl monomers, and in such a manner it has been difficult for the reversed-phase suspension polymerization methods to carry out copolymerization using a large quantity of hydrophobic monomers.

SUMMARY OF THE INVENTION

The present invention has been made in view of the above-mentioned circumstances.

A first aspect of the present invention is a production method of a hydroxyl-containing polymer comprising: protecting a hydroxyl group of a hydroxyl-containing monomer with a protecting group to make the monomer a protected monomer with decreased hydrophilicity; adding the protected monomer alone or together with a hydrophobic monomer to a water-based medium containing a salt and a dispersion stabilizer; adding a polymerization initiator to the mixture to carry out suspension polymerization; and de-protecting the obtained polymer having the protecting group to recover the hydroxyl group.

A second aspect of the present invention is a production method of a hydroxyl-containing polymer comprising: protecting a hydroxyl group of a hydroxyl-containing monomer with a protecting group to make the monomer a protected monomer with decreased hydrophilicity; adding the protected monomer alone or together with a hydrophobic monomer to a water-based medium containing a salt and a dispersion stabilizer; adding a polymerization initiator to the mixture to carry out suspension polymerization; and de-protecting the obtained polymer having the protecting group to recover the hydroxyl group, wherein a crosslinking agent is further added to the water-based medium to obtain a granular polymer.

A third aspect of the present invention is a production method of a hydroxyl-containing polymer comprising: protecting a hydroxyl group of a hydroxyl-containing monomer with a protecting group to make the monomer a protected monomer with decreased hydrophilicity; adding the protected monomer alone or together with a hydrophobic monomer to a water-based medium containing an inorganic salt and a dispersion stabilizer; adding a polymerization initiator to the mixture to carry out suspension polymerization; and de-protecting the obtained polymer having the protecting group to recover the hydroxyl group.

DETAILED DESCRIPTION OF THE INVENTION

In the production method of a hydroxyl-containing polymer of the present invention, at first a hydroxyl group of a hydroxyl-containing monomer is protected by a protecting group for making the monomer a protected monomer with decreased hydrophilicity (preferably with hydrophobicity). Next, the protected monomer is added to a water-based medium, in which a salt is dissolved, in the presence of a dispersion stabilizer. Further a polymerization initiator is added to the mixture to carry out suspension polymerization. After that, the protecting group of the obtained polymer is removed to recover hydroxyl group and obtain a hydroxyl-containing polymer. In the production method of the invention, a hydroxyl-containing polymer can be obtained by adding a hydrophobic monomer together with the protected monomer at an optional ratio to the water-based medium, too.

At the time of suspension polymerization, a crosslinking agent may be mixed based on necessity to the water-based medium to obtain granular hydroxyl-containing crosslinked polymer particles.

Conventionally, since hydroxyl-containing monomers such as hydroxyethyl (meth) acrylate, polyethylene glycol (meth) acrylate, and the like are water-soluble, it has been difficult to produce hydroxyl-containing polymers at high efficiency by suspension polymerization in water-based mediums.

However, hydroxyl group of a hydroxyl-containing monomer is protected by a protecting group and a salt is dissolved in a water-based medium, so that the protected monomer can be located mainly in an oil layer of the suspension polymerization system and agglomeration of particles formed during the suspension polymerization can be suppressed. Further, de-protection after polymerization makes it possible to produce a hydroxyl-containing polymer easily at a high yield. Further, an easy production of a copolymer from a hydrophobic monomer and a hydrophilic monomer at a desired weight ratio is realized, although it has conventionally been difficult to control the weight ratio.

Hereinafter, a production method of a hydroxyl-containing polymer of the invention will be described in more detail along with the production steps.

<Step of Protecting Hydroxyl-Containing Monomer>

In the invention, at first, a hydroxyl group of a hydroxyl-containing monomer is protected with a protecting group to make the monomer a protected monomer with decreased hydrophilicity (preferably with hydrophobicity).

(Hydroxyl-Containing Monomer)

The hydroxyl-containing monomer to be used in the invention is not particularly limited as long as it contains hydroxyl group. However, when the hydroxyl group is in the form of a carboxyl group, the group works as carboxyl group but not as hydroxyl in accordance with the characteristics, and therefore it is not preferable. Specific examples of the hydroxyl-containing monomer are hydroxyethyl(meth)acrylate, polyethylene glycol(meth)acrylate, hydroxycyclohexyl (meth)acrylate, hydroxypropyl(meth)acrylate, and the like. Among them, hydroxyethyl(meth)acrylate, polyethylene glycol(meth)acrylate are especially preferable to be used.

The term "(meth)acrylate" means acrylate or methacrylate, and is used hereinafter in the same way.

(Protection by Protecting Group)

It is required to protect the hydroxyl group of the hydroxyl-containing monomer with a protecting group. This treatment makes hydrophilicity of the monomer lower (preferably converts the monomer to be hydrophobic) and makes suspension polymerization possible with suppressed agglomeration of particles.

As the protecting group, conventionally known protecting groups such as tetrahydropyranyl, trimethylsilyl, tert-butyldiphenylsilyl, benzyl, tert-butyl, and trityl can be exemplified. Among them, tetrahydropyranyl, trimethylsilyl, and tert-butyldiphenylsilyl are more preferable, and tetrahydropyranyl is even more preferable from a viewpoint of the easiness of protection and de-protection.

Conventionally known methods carried out commonly may be employed as the protection method. For example, in the case of forming tetrahydropyranyl as a protecting group, dihydropyran is stirred with the hydroxyl-containing monomer at room temperature in the presence of an acid catalyst such as hydrochloric acid to convert the hydroxyl group into tetrahydropyranyl and thus obtain a protected monomer.

<Suspension Polymerization Step>

Next, in the invention, there is a step of carrying out suspension polymerization by mixing the protected monomer alone or together with a hydrophobic monomer into a water-based medium dissolving a salt therein in the presence of a dispersion stabilizer and by further adding a polymerization initiator.

(Hydrophobic Monomer)

In the invention, together with the above obtained protected monomer, a hydrophobic monomer can be subjected to suspension polymerization at an optional ratio to obtain a hydroxyl-containing copolymer. The hydrophobic monomer is not particularly limited, as long as it is hardly soluble in water and is other than the protected monomer of the invention. Examples of such a hydrophobic monomer may include aromatic vinyl monomers such as styrene and α-methylstyrene; (meth) acrylic acid alkyl esters having alkyl or aralkyl of 1 to 18 carbon atoms (preferably 2 to 16 carbon atoms), e.g. methyl (meth) acrylate, ethyl (meth) acrylate, propyl (meth) acrylate, butyl (meth) acrylate, cyclohexyl (meth) acrylate, 2-ethylhexyl (meth) acrylate, lauryl (meth) acrylate, and benzyl (meth) acrylate; (meth) acrylic acid alkoxyalkyl esters having alkylene groups of 1 to 12 carbon atoms (preferably 2 to 10 carbon atoms), e.g. methoxymethyl (meth) acrylate, methoxyethyl (meth) acrylate, ethoxymethyl (meth) acrylate, ethoxyethyl (meth) acrylate, ethoxybutyl (meth) acrylate, n-butoxymethyl (meth) acrylate, and n-butoxyethyl (meth) acrylate; amino group-containing (meth) acrylic acid esters, e.g. diethylaminoethyl (meth) acrylate and dipropylaminoethyl (meth) acrylate; acrylonitrile, ethylene, vinyl chloride, and vinyl acetate.

Among them, styrene, methyl (meth) acrylate, butyl (meth) acrylate, 2-ethylhexyl (meth) acrylate, lauryl (meth) acrylate, ethoxybutyl (meth) acrylate, benzyl (meth) acrylate, and diethylaminoethyl (meth) acrylate are preferable, and styrene, methyl (meth) acrylate, and butyl (meth) acrylate are even more preferable.

The content of the hydrophobic monomer is preferably 0 to 90% by mass, more preferably 10 to 80% by mass, and even more preferably 20 to 70% by mass, in the total monomers (the protected monomer and hydrophobic monomer).

(Water-Based Medium)

As the water-based medium in the invention, water and mixtures of water with water-soluble organic solvents such as methanol and ethanol are preferable to be used, and among them water is specially preferable. In the case the water-soluble organic solvent is added, although depending on the properties of the monomers to be suspended, the addition amount is preferably 30% by mass or lower and especially preferably 10% by mass or lower in the entire solvent. The dispersion stability can be kept good when the addition amount is 30% by mass or lower.

(Salt)

In the invention, it is indispensable to dissolve a salt in the above-mentioned water-based medium. Owing to salting out effect, a reaction of emulsion polymerization can be suppressed, dispersion stability is obtained, and a high yield can be accomplished.

As the salt to be dissolved, both inorganic water-soluble salts and organic water-soluble salts can be used, and inorganic salts are especially preferable. Examples of the inorganic salts are sodium chloride, potassium chloride, potassium carbonate, calcium chloride, ammonium chloride, sodium sulfate, sodium acetate, ammonium sulfate, magnesium chloride, and magnesium sulfate. Among them, sodium chloride, potassium chloride, potassium carbonate, and calcium chloride are more preferable, and sodium chloride is even more preferable.

The salt is preferably added in such an amount that the water-based medium has a salt concentration of preferably 5% by mass or more, more preferably 10% by mass or more, and even more preferably 15% by mass or more, from a viewpoint of the dispersion stability.

(Dispersion Stabilizer)

In the invention, it is indispensable to make a dispersion stabilizer existing in the water-based medium.

As the above-mentioned dispersion stabilizer, conventionally known dispersion stabilizers can be used and inorganic powders such as a calcium carbonate powder, a calcium phosphate powder, and the like are preferable to be used. Further, a surfactant such as an anionic emulsifier, a nonionic emulsifier, and a cationic emulsifier is also preferably used in combination with the inorganic powder.

An optional amount of the above-mentioned dispersion stabilizer can be used, however the amount is preferably 1 to 20 parts by mass and even more preferably 2 to 10 parts by mass based on 100 parts by mass of the total monomer components. Good dispersion state can be kept by adjusting the amount to be 1 part or more. Formation of very fine particles can be suppressed and the particle distribution of the polymer to be obtained can be sharp when adjusting the amount to be 20 parts by mass or less.

(Polymerization Initiator)

In the invention, it is indispensable to add a polymerization initiator together with the protected monomer and the optional hydrophobic monomer to the water-based medium. As a preferable polymerization initiator to be used, azo-type polymerization initiators and peroxide-type polymerization initiators can be exemplified and among them, oil-soluble polymerization initiators are preferable.

As oil-soluble azo polymerization initiators, azobis isobutyronitrile (AIBN, trade name: V-60, manufactured by Wako Pure Chemical Industries, Ltd.), 2,2'-azobis 2-methylbutyronitrile (trade name: V-59, manufactured by Wako Pure Chemical Industries, Ltd.), and 2,2'-azobis 2,4-dimethylvaleronitrile (trade name: V-65, manufactured by Wako Pure Chemical Industries, Ltd.) can be exemplified. As oil-soluble peroxide-type polymerization initiators, benzoyl peroxide can be exemplified.

The above-mentioned polymerization initiator can be used in an optional amount, and is used preferably in an amount of 0.05 to 10 parts by mass and more preferable 0.1 to 5 parts by mass based on 100 parts by mass of the total monomer components.

(Crosslinking Agent)

At the time of suspension polymerization in the invention, a crosslinking agent may be added based on the necessity. Addition of the crosslinking agent to the monomer mixture solution makes it possible to obtain granular hydroxyl-containing crosslinked polymer particles.

As the crosslinking agent to be used, conventionally known crosslinking agents may properly be selected and used, and preferable examples are divinylbenzene, ethylene glycol di(meth)acrylate, diethylene glycol di(meth)acrylate, methylene bis(meth)acrylamide, glycidyl(meth)acrylate, and 2-([1'-methylpropylideneamino]carboxyamino)ethyl methacrylate. Among them, divinylbenzene, ethylene glycol di(meth)acrylate, diethylene glycol di(meth)acrylate are more preferable, and divinylbenzene is even more preferable.

The addition amount of the crosslinking agent is preferably 0.1 to 100 parts by mass and more preferably 0.5 to 50 parts by mass based on 100 parts by mass of the total monomer components.

(Other Additives)

In the above-mentioned suspension polymerization step, a dye, a pigment, and a carbon black may be added to the monomer mixture solution for coloring the polymer, and magnetic powders may also be added. Also, together with the monomer components, non-polymerizable additives such as toluene, octane, cyclohexane, dibutyl phthalate, and lauryl alcohol may be added to make the particles have porous structure by extraction and removal of them after polymerization. In the case of using other additives, the addition amount thereof is preferably 0.1 to 200 parts by mass based on 100 parts by mass of the total monomer components.

(Suspension Method)

In the invention, as described above, a protected monomer, an optional hydrophobic monomer, a polymerization initiator, an optional crosslinking agent and the like are added to a water-based medium dissolving a salt therein and containing a dispersion stabilizer, and a polymerization reaction is then carried and by a suspending method. Conventionally known suspending methods can be employed. For example, mechanical suspending methods such as a method for suspending monomers in a water-based medium by rotating special stirring blades at high speed just like a mixer; a method for suspending them by shearing force of a rotor stator known as a homogenizer; and a method for suspending them by ultrasonic wave can be exemplified. Further, an emulsifying method known as a film emulsification method by preparing a liquid containing the above-mentioned monomers and extruding the liquid to a water-based medium through a porous film can be employed for suspension polymerization.

Additionally, the polymerization reaction may be carried out not only in atmospheric pressure but also in pressurizing condition, such other reaction conditions may be employed based on the necessity and not particularly limited.

<De-Protection Step>

In the invention, after the above-mentioned suspension polymerization step, the protecting group of the obtained polymer is removed to recover hydroxyl group and thus obtain the hydroxyl-containing polymer.

(De-Protection)

As a de-protection method, similarly to the above-mentioned methods of protecting hydroxyl groups, conventionally known methods can be employed. For example, in the case of forming tetrahydropyranyl group as the protecting group, the protecting group can easily taken out by heating and stirring the obtained polymer in a mixed solvent of hydrochloric acid and an organic solvent such as dioxane, and thereby hydroxyl group is recovered.

The hydroxyl-containing polymer thus obtained is diluted and dispersed in a solvent such as methanol or the like, is filtered, and is washed with water and/or a solvent. After that, the polymer may be isolated in the form of a powder by normal means such as spray drying, vacuum drying, or freeze drying.

<Physical Properties of Hydroxyl-Containing Polymer>

(Hydroxyl Group Amount)

The hydroxyl group amount in the hydroxyl-containing polymer obtained in the above-mentioned operations can be measured by a common titration method. For example, a prescribed amount of a reagent such as pyridine solution of acetic anhydride is added to the polymer; the mixture is heated and mixed with water for hydrolysis and the resulting mixture is separated into particles and supernatant solution by a centrifuge. Using an indicator such as phenolphthalein, the supernatant is subjected to titration measurement with an ethanol-potassium hydroxide solution to determine the hydroxyl group amount.

The hydroxyl group amount in the hydroxyl-containing polymer of the invention differs depending on the uses, however it is preferably 0.01 to 7 mmol/g and more preferably 0.1 to 5 mmol/g.

(Molecular Weight)

The molecular weight (number average molecular weight) of the hydroxyl-containing polymer of the invention differs depending on the uses. However it is preferably 5,000 to 1,000,000 and more preferably 10,000 to 500,000, when no crosslinking agent is used in the suspension polymerization step.

The hydroxyl-containing polymer obtained by the production method of the invention is suitably used for carriers of diagnosis drugs and pharmaceutical products, chromatography carriers, viscosity adjustment agents, resin molding materials, coating material additives, crosslinking/curing agents, and cosmetic product additives.

EXAMPLES

Hereinafter, the present invention will be described in more detail with reference to Examples. However, it is not intended that the invention be limited to the illustrated embodiments. The terms "part" and "%" in Examples stand for "part by mass" and "% by mass", respectively.

Synthesis Example 1

[Protection of OH Group in Hydroxyethyl Methacrylate]

A screw mouth-type bottle containing 55.4 g (0.43 mol) of hydroxyethyl methacrylate (trade name: Acryester HO; manufactured by Mitsubishi Rayon Co., Ltd.) and 37.0 g (0.44 mol) of dihydropyran (trade name: 3,4-Dihydro-2H-pyran; manufactured by Wako Pure Chemical Industries, Ltd.) is tightly closed by a rubber plug (Biton plug) and immersed in an ice bath. 0.47 g of concentrated hydrochloric acid is further added to the mixture, and the mixture is stirred at room temperature for 6 hours. The obtained reaction solution is passed through a column filled with sodium hydroxide to obtain a tetrahydropyranyl ether in which the OH group of hydroxyethyl methacrylate is protected by a protecting group.

Synthesis Example 2

[Protection of OH Group in Polyethylene Glycol Methacrylate]

A screw mouth-type bottle containing 25 g (0.06 mol) of polyethylene glycol methacrylate (trade name: Blemmer PE 350; manufactured by Nippon Oil & Fats Co., Ltd.) and 5.9 g (0.07 mol) of dihydropyran (trade name: 3,4-Dihydro-2H-pyran; manufactured by Wako Pure Chemical Industries, Ltd.) is tightly closed by a ball cock and immersed in an ice bath. 0.02 g of concentrated hydrochloric acid is further added to the mixture, and the mixture is stirred at room temperature for 6 hours. The obtained reaction solution is passed through a column filled with sodium hydroxide to obtain tetrahydropyranyl ether in which the OH group of polyethylene glycol methacrylate is protected by a protecting group.

Example 1

10 parts of calcium carbonate (trade name: Luminus, manufactured by Maruo Calcium Co., Ltd.) is added as a dispersion stabilizer to an aqueous solution obtained by dissolving 29 parts of sodium chloride in 120 parts of ion-exchanged water, and the mixture is dispersed for 24 hours by a ball mill. A monomer mixed solution containing 85 parts of the tetrahydropyranyl ether (obtained in Synthesis Example 1), 40 parts of a styrene monomer (manufactured by Wako Pure Chemical Industries, Ltd.), and 2.5 parts of azobis isobutyronitrile (trade name: V-60, manufactured by Wako Pure Chemical Industries, Ltd.) as a polymerization initiator is added to the obtained dispersion and emulsified at 8,000 rpm for 3 minutes by an emulsifying apparatus (HIGH-FLEX HOMOGENIZER, manufactured by SMT Co., Ltd.) to obtain a suspension. Meanwhile, nitrogen is introduced into a separable flask provided with a stirrer, a thermometer, a condenser pipe, and a nitrogen introduction pipe through the nitrogen introduction pipe to replace the gas in the flask with nitrogen. The suspension is loaded into the flask and reacted by heating at 65° C. for 3 hours and at 70° C. for a further 10 hours and then cooled. The obtained reaction solution becomes a good dispersion and no agglomerate is produced during the polymerization. A 10% hydrochloric acid aqueous solution is added to the reaction solution to decompose calcium carbonate and then the mixed reaction solution is subjected to solid-liquid separation by centrifugation. The obtained particles are washed with 1 L of ion-exchanged water to obtain protected polymer particles. The polymer particles are dried at 60° C. in an oven and the yield of the polymer is measured to find that the amount is 124 parts and the yield is approximately 100%.

50 parts of the polymer particles are loaded into a screw mouth-type bottle and mixed with 300 parts of dioxane (trade name: 1,4-dioxane, manufactured by Wako Pure Chemical Industries, Ltd.) and 100 parts of concentrated hydrochloric acid and again dispersed. The dispersed mixture is heated at 50° C. for 3 hours under stirring to carry out a de-protection reaction. After vacuum filtration, the obtained product is washed with dioxane and methanol and further with ion-exchanged water and vacuum dried at 40° C. to obtain a hydroxyl-containing polymer. The hydroxyl group amount in the hydroxyl-containing polymer thus obtained is measured by the following method.

The above-mentioned hydroxyl-containing polymer is weighed and put in a cap-equipped test tube, a prescribed amount of a previously prepared pyridine (manufactured by Wako Pure Chemical Industries, Ltd.) solution of acetic anhydride (manufactured by Wako Pure Chemical Industries, Ltd.) is added, and the mixture is heated at 95° C. for 24 hours.

Further, distilled water is added to hydrolyze the acetic anhydride in the test tube, and then the polymer mixture is centrifuged at 3,000 rpm for 5 minutes to separate particles and a supernatant solution. The polymer is further subjected repeatedly to supersonic dispersion and centrifugation in ethanol (manufactured by Wako Pure Chemical Industries, Ltd.) for washing, and the supernatant solution and the washing solution are collected in a conical beaker and subjected to titration with a 0.1 M potassium hydroxide-ethanol solution (manufactured by Wako Pure Chemical Industries, Ltd.) using phenolphthalein (manufactured by Wako Pure Chemical Industries, Ltd.) as an indicator.

A blank test using no polymer is also carried out and the hydroxyl group amount (mmol/g) is calculated according to the following equation from the difference between the two.

$$\text{Hydroxyl group amount} = ((B-C) \times 0.1 \times f)/w$$

In this equation, B denotes the titrated amount (ml) in the blank test; C denotes the titrated amount (ml) in the sample; f denote a factor of the potassium hydroxide solution; and w denotes the mass (g) of the particles.

The hydroxyl group amount of the hydroxyl-containing polymer in Example 1 is 3.8 mmol/g.

Example 2

10 parts of calcium carbonate (trade name: Luminus, manufactured by Maruo Calcium Co., Ltd.) is added as a dispersion stabilizer to an aqueous solution obtained by dissolving 29 parts of sodium chloride in 120 parts of ion-exchanged water, and the mixture is dispersed for 24 hours by a ball mill. A monomer mixed solution containing 90 parts of the tetrahydropyranyl ether (obtained in Synthesis Example 2), 30 parts of a styrene monomer (manufactured by Wako Pure Chemical Industries, Ltd.), 1.5 parts of divinylbenzene as a crosslinking agent (manufactured by Wako Pure Chemical Industries, Ltd.), and 2.0 parts of azobis isobutyronitrile (trade name: V-60, manufactured by Wako Pure Chemical Industries, Ltd.) as a polymerization initiator is added to the obtained dispersion and emulsified at 8,000 rpm for 3 minutes by an emulsifying apparatus (HIGH-FLEX HOMOGENIZER, manufactured by SMT Co., Ltd.) to obtain a suspension. Meanwhile, nitrogen is introduced into a separable flask provided with a stirrer, a thermometer, a condenser pipe, and a nitrogen introduction pipe through the nitrogen introduction pipe to replace the gas in the flask with nitrogen. The suspension is loaded into the flask and reacted by heating at 65° C. for 3 hours and at 70° C. for a further 10 hours and then cooled. The obtained reaction solution becomes a good dispersion and no agglomerate is produced during the polymerization. A 10% hydrochloric acid aqueous solution is added to the reaction solution to decompose calcium carbonate, and then the mixed reaction solution is subjected to solid-liquid separation by centrifugation. The obtained particles are washed with 1 L of ion-exchanged water to obtain protected polymer particles. The polymer particles are dried at 60° C. in an oven and the yield of the polymer is measured to find that the amount is 120 parts and the yield is approximately 100%.

50 parts of the polymer particles are loaded into a screw mouth-type bottle and mixed with 300 parts of dioxane (trade name: 1,4-dioxane, manufactured by Wako Pure Chemical Industries, Ltd.) and 100 parts of concentrated hydrochloric acid and again dispersed. The dispersed mixture is heated at 50° C. for 3 hours under stirring to carry out a de-protection reaction. After vacuum filtration, the obtained product is washed with dioxane and methanol and further with ion-exchanged water and vacuum dried at 40° C. to obtain hydroxyl-containing crosslinked polymer particles. The hydroxyl group amount in the hydroxyl-containing crosslinked polymer particles thus obtained is measured by the same method as in Example 1 to find that the hydroxyl group amount is 1.7 mmol/g.

Comparative Example 1

Suspension polymerization is carried out in the same manner as in Example 1, except that hydroxyethyl methacrylate whose OH group is not protected is used in place of the tetrahydropyranyl ether obtained in Synthesis Example 1. Agglomeration takes place during the polymerization reaction to form large agglomerates.

Comparative Example 2

A monomer mixed solution is suspended and subjected to polymerization in the same manner as in Example 2 except that no sodium chloride is added. Emulsion polymerization is subsequently caused in the water-based medium to lower the yield of polymer particles to 30%.

As described above, the invention provides a hydroxyl-containing polymer production method for easily producing a polymer of a hydroxyl-containing monomer by suspension polymerization in a water-based medium at a high yield with suppressed agglomeration of particles, and also provides a hydroxyl-containing polymer production method for easily producing a copolymer of a hydroxyl-containing monomer and a hydrophobic monomer at a desired copolymerization ratio by suspension polymerization in a water-based medium at a high yield with suppressed agglomeration of particles.

What is claimed is:

1. A production method of a hydroxyl-containing polymer comprising:
   protecting a hydroxyl group of a hydroxyl-containing monomer with a protecting group to make the monomer a protected monomer with decreased hydrophilicity;
   adding the protected monomer alone or together with a hydrophobic monomer to a water-based medium containing a salt and a dispersion stabilizer;
   adding a polymerization initiator to the mixture to carry out suspension polymerization; and
   de-protecting the obtained polymer having the protecting group to recover the hydroxyl group, wherein the protected monomer is located mainly in an oil layer of the suspension polymerization system during the suspension polymerization, and wherein the hydroxyl-containing monomer is at least one monomer selected from the group consisting of hydroxyethyl (meth)acrylate, polyethylene glycol (meth)acrylate, hydroxycyclohexyl (meth)acrylate, and hydroxypropyl (meth)acrylate.

2. A production method of a hydroxyl-containing polymer comprising:
   protecting a hydroxyl group of a hydroxyl-containing monomer with a protecting group to make the monomer a protected monomer with decreased hydrophilicity;
   adding the protected monomer alone or together with a hydrophobic monomer to a water-based medium containing a salt and a dispersion stabilizer;
   adding a polymerization initiator to the mixture to carry out suspension polymerization; and
   de-protecting the obtained polymer having the protecting group to recover the hydroxyl group,
   wherein a crosslinking agent is further added to the water-based medium to obtain a granular polymer, wherein the protected monomer is located mainly in an oil layer of the suspension polymerization system during the suspension polymerization, and wherein the hydroxyl-containing monomer is at least one monomer selected from the group consisting of hydroxyethyl (meth)acrylate, polyethylene glycol (meth)acrylate, hydroxycyclohexyl (meth)acrylate, and hydroxypropyl (meth)acrylate.

3. The production method according to claim 2, wherein the crosslinking agent is at least one compound selected from the group consisting of divinylbenzene, ethylene glycol di(meth)acrylate, diethylene glycol di(meth)acrylate, methylene bis(meth)acrylamide, glycidyl (meth)acrylate, and 2-([1'-methylpropylideneamino]carboxyamino)ethyl methacrylate.

4. The production method according to claim 1, wherein the hydroxyl-containing monomer is at least one monomer selected from the group consisting of hydroxyethyl (meth) acrylate and polyethylene glycol (meth)acrylate.

5. The production method according to claim 1, wherein the hydrophobic monomer is at least one monomer selected from the group consisting of styrene, methyl (meth)acrylate, butyl (meth)acrylate, 2-ethylhexyl (meth)acrylate, lauryl (meth)acrylate, ethoxybutyl (meth)acrylate, benzyl (meth) acrylate, and diethylaminoethyl (meth)acrylate.

6. The production method according to claim 1, wherein the content of the hydrophobic monomer is 0 to 90% by mass of the total monomer components.

7. The production method according to claim 6, wherein the content of the hydrophobic monomer is 10 to 80% by mass of the total monomer components.

8. The production method according to claim 1, wherein the protecting group is a tetrahydropyranyl group, which is formed by a reaction of the hydroxyl-containing monomer with dihydropyran.

9. A production method of a hydroxyl-containing polymer comprising:
   protecting a hydroxyl group of a hydroxyl-containing monomer with a protecting group to make the monomer a protected monomer with decreased hydrophilicity;
   adding the protected monomer alone or together with a hydrophobic monomer to a water-based medium containing an inorganic salt and a dispersion stabilizer;
   adding a polymerization initiator to the mixture to carry out suspension polymerization; and
   de-protecting the obtained polymer having the protecting group to recover the hydroxyl group, wherein the protected monomer is located mainly in an oil layer of the suspension polymerization system during the suspension polymerization, and wherein the hydroxyl-containing monomer is at least one monomer selected from the group consisting of hydroxyethyl (meth)acrylate, polyethylene glycol (meth)acrylate, hydroxycyclohexyl (meth)acrylate, and hydroxypropyl (meth)acrylate.

10. The production method according to claim 9, wherein the inorganic salt is at least one selected from the group consisting of sodium chloride, potassium chloride, potassium carbonate, calcium chloride, ammonium chloride, sodium sulfate, sodium acetate, ammonium sulfate, magnesium chloride, and magnesium sulfate.

11. The production method according to claim 9, wherein the inorganic salt concentration in the water-based medium is 5% by mass or higher.

12. The production method according to claim 1, wherein the water-based medium is water.

13. The production method according to claim 1, wherein the dispersion stabilizer is an inorganic powder.

14. The production method according to claim 13, wherein the inorganic powder is at least one selected from the group consisting of calcium carbonate powder and calcium phosphate powder.

15. The production method according to claim 1, wherein the content of the dispersion stabilizer is 1 to 20 parts by mass based on 100 parts by mass of the total monomer components.

16. The production method according to claim 1, wherein the polymerization initiator is at least one selected from the group consisting of an azo-type polymerization initiator and a peroxide-type polymerization initiator.

17. The production method according to claim 1, wherein the hydroxyl group amount in the obtained hydroxyl-containing polymer is 0.01 to 7 mmol/g.

18. The production method according to claim 1, wherein the number average molecular weight of the obtained hydroxyl-containing polymer is 5,000 to 1,000,000.

19. The production method according to claim 1, further comprising adding an additive to the monomer(s) for coloring the polymer, wherein the additive is selected from the group consisting of a dye, a pigment and a carbon black.

* * * * *